*(12)* United States Patent
Arora et al.

(10) Patent No.: US 11,962,497 B2
(45) Date of Patent: Apr. 16, 2024

(54) SYSTEMS AND METHOD FOR PROPAGATING ROUTE INFORMATION

(71) Applicant: Arista Networks, Inc., Santa Clara, CA (US)

(72) Inventors: Saurav Arora, Uttar Pradesh (IN); Akshay Gattani, Sunnyvale, CA (US); Sandeep Betha, Burnaby (CA); Sharad Birmiwal, Surrey (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 18/305,823

(22) Filed: Apr. 24, 2023

(65) Prior Publication Data

US 2023/0261988 A1 Aug. 17, 2023

Related U.S. Application Data

(62) Division of application No. 17/142,446, filed on Jan. 6, 2021, now Pat. No. 11,671,357.

(51) Int. Cl.
*H04L 45/50* (2022.01)
*H04L 12/46* (2006.01)
*H04L 45/741* (2022.01)

(52) U.S. Cl.
CPC .......... *H04L 45/50* (2013.01); *H04L 12/4633* (2013.01); *H04L 12/4675* (2013.01); *H04L 45/741* (2013.01)

(58) Field of Classification Search
CPC . H04L 45/50; H04L 12/4633; H04L 12/4675; H04L 45/741; H04L 12/4641
See application file for complete search history.

(56) References Cited

U.S. PATENT DOCUMENTS

| 8,014,317 | B1* | 9/2011 | Ghosh | ................. | H04L 12/4633 |
| | | | | | 370/254 |
| 2009/0041032 | A1 | 2/2009 | Dong et al. | | |
| 2014/0146664 | A1 | 5/2014 | Amante | | |
| 2016/0218961 | A1* | 7/2016 | Lindem, III | ........ | H04L 12/4633 |
| 2020/0169516 | A1 | 5/2020 | Patel et al. | | |
| 2021/0135980 | A1 | 5/2021 | Pai et al. | | |
| 2022/0217084 | A1 | 7/2022 | Arora | | |
| 2023/0261988 | A1* | 8/2023 | Arora | ..................... | H04L 45/50 |
| | | | | | 370/392 |

* cited by examiner

*Primary Examiner* — Luat Phung
(74) *Attorney, Agent, or Firm* — Fountainhead Law Group P.C.

(57) ABSTRACT

Techniques disclosed herein provide a method and systems for installing routes by a route reflect (RR) device when the tunnel RIB of the RR device does not include any tunnel labels definitions. The unicast routing information base (RIB) of route reflector (RR) device is configured to include a next hop associated with a first network device. When the RR device receives a route from the first network device that comprises a tunnel label for reaching the second network device, the RR device resolves the next hop of the received route using the unicast RIB of the RR device. In response to the resolving, the RR device forwards the route to a third network device (e.g., identified by an export route target of the RR device).

20 Claims, 5 Drawing Sheets

300

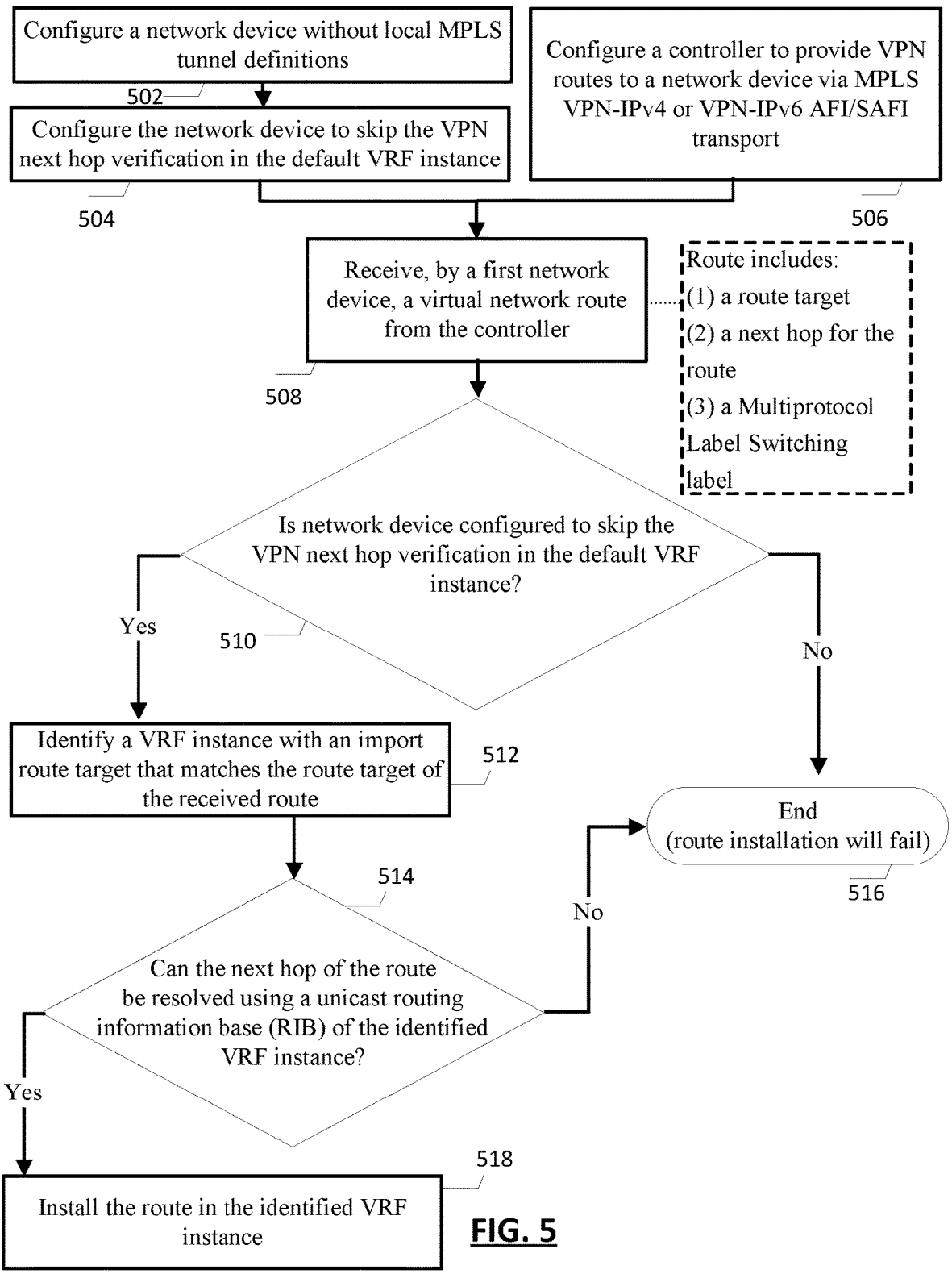

SYSTEMS AND METHOD FOR PROPAGATING ROUTE INFORMATION

CROSS-REFERENCE TO RELATED APPLICATIONS

This application is a divisional of U.S. patent application Ser. No. 17/142,446, filed Jan. 6, 2021, the content of which is herein incorporated by reference in its entirety for all purposes.

BACKGROUND

The present disclosure relates to improvements in route propagation. In particular, the disclosure relates to improved techniques for route installation in a route reflector using its unicast routing information base to verify reachability and to improve techniques for installing routes in a packet forwarding device that lacks local Multiprotocol Label Switching (MPLS) definitions using MPLS transport.

SUMMARY

In computer networks, provider edges (PE), may be locally connected to the various hosts. In addition, PEs may be connected to each other either directly or indirectly to enable routing and bridging of data between PEs and between hosts services by each PE device. In some embodiments, the PEs in the network may utilize Border Gateway Protocol (BGP) to exchange routing and reachability information between each other. More particularly, if the network is an autonomous system, the PEs may rely on Interior Border Gateway Protocol (IBGP) to propagate known network routes.

Typically, to avoid problems such as routing loops (e.g., to avoid split horizon rules), the PE will have to operate as a part of complete IBGP mesh. In one implementation, each PE is able to forward new route information (e.g., information regarding a newly connected host) to all other PEs in the mesh network. For example, all PEs may be IBGP peers. However, as the network grows, establishment and maintenance of a full mesh may be difficult or infeasible because the number of links will grow exponentially with the addition of new PEs.

To overcome the scalability problem, a network may utilize Route Reflector (RR) devices. An RR device may be configured to relay route or reachability information to devices (e.g., some subset of PEs) identified by a route target list (e.g., in a route target community configuration field). In this way, IBGP reachability information may be propagated though the network without the need for a full mesh connectivity.

In some embodiments, an RR device may also be a PE device that is tasked with routing data in addition to propagating route or reachability information. However, in some embodiments, an RR device may be a dedicated route reflector device that does not route or bridge data packets on its own. This distinction is particularly important in networks that use virtual private network (VPN) or ethernet virtual private network (EVPN) topologies. For example, a network may utilize short path (tunnel) labels rather than long network addresses. The labels may identify virtual paths between distant nodes (e.g., PEs or hosts) rather than simply list addresses of endpoints. For example, such a tunnel label may be a Multiprotocol Label Switching (MPLS) labels or a Virtual Extensible LAN (VxLAN) identifiers (VNIs). MPLS architecture can encapsulate packets of various network protocols.

For example, when MPLS topology is configured in a network, each PE may be configured to store, in its tunnel routing information base (RIB), a route definition for each MPLS label. In addition, each PE may have a unicast RIB for storing routes to particular network destinations and metrics (distances) associated with those routes. However, because an RR device may not be in a traffic forwarding path, it may lack MPLS tunnel definitions and/or VNI definitions. Normally, a BGP implementation requires an RR device that receives reachability information to check its RIBs to determine if the next hop for the received route is reachable before advertising that route to other network devices (e.g., to devices identified by route target list). However, because in some implementations discussed above the RR device is not in the traffic forwarding path, it may lack the MPLS and/or VNI definitions. Consequently, if an RR attempts to resolve a next hop of a newly received route that includes a tunnel label (e.g., an MPLS label or a VNI), the RR will reference its tunnel RIB and will fail to resolve the next hop for the route (because the tunnel labels are not defined on the RR device). Consequently, the RR will not further propagate the route to its devices in its route target list, which completely frustrates the purpose of the RR device.

In one approach, the RR device may be configured to simply skip the next hop resolution step for establishing path eligibility. However, such an approach limits any kind of granularity and simply allows for RR to propagate all routes, regardless of where they were received from. To solve this problem, an approach provided herein allows the RR to forward tunnel routes even if it lacks tunnel definitions while providing additional granularity. The approach allows the RR device to resolve routes that include a tunnel label (e.g., an MPLS label) using its unicast RIB in addition to or instead of the tunnel RIB. For example, a unicast RIB of an RR device may be configured to include an address of PE (e.g., a PE from which routes with a tunnel label may be expected to be received) in combination with an arbitrary next hop (e.g., a bogus next hop). In another example, a prefix of the address of such a PE may be included in the unicast RIB of the RR with appropriate subnet mask. The installation of a bogus next hop IP address is not problematic because in this implementation the RR device will never route actual data packets.

In this implementation, when an RR device receives a path or reachability information from a PE, it may attempt to check that path's eligibility using just the address of the PE as the next hop, even if the path or reachability information includes a tunnel label (e.g., an MPLS label or VNI). Since the unicast RIB of that RR was preconfigured with a next hop (e.g., a bogus next hop) for the address or for the prefix of the PE, the RR will resolve the received route using its unicast RIB and will proceed to propagate the received route (e.g., an MPLS route or EVPN route) to devices identified in its route target list.

In some embodiments, the unicast RIB of the RR may also include a default drop route (e.g., route for address 0.0.0.0 with a 0.0.0.0 subnet mask). This entry will guarantee resolvability of any next hop. In some embodiments, such a default drop route may be used to mimic simply skipping a next hop resolution step for establishing path eligibility, e.g., if granularity is not needed in certain situations.

In some embodiments, a network device (e.g., a customer switch or router) may include multiple virtual routing and forwarding (VRF) instances. Each VRF instance may be a separate instance that includes its own RIB or RIBs for defining multiple paths (e.g., BGP selected unicast paths, static paths, Virtual Extensible Local Area Network (VxLAN) tunnels, etc.) to a list of devices identified by a route target list. The network device may have separate VRF instances to segment network paths without requiring multiple routers.

In some embodiments, it may be desirable to configure routes on all VRFs (both tunnel routes and IP unicast routes) of the network device via routes received from another network device (e.g., a controller). For example, the controller may be used to provide desired routes for installation to various customer premise equipment (CPE) devices and other switches in the network (e.g., devices that the controller is not directly connected to). In some embodiments, the routes may be imported from a BGP VPN address family identifier/sub-address family identifier AFI/SAFI table stored by the controller.

In some embodiments, the transfer of routes from the BGP VPN AFI/SAFI table stored by the controller to the network device may be performed via MPLS VPN-IPv4 or VPN-IPv6 AFI/SAFI transport to install routes stored by the controller in the correct VRFs of the network device based on matching route targets configured for each VRF, even though the network device has no locally configured MPLS tunnel definitions. Such a non-standard use of MPLS VPN has several advantages. First, it eliminates the need to configure static routes on the network device (e.g., a customer switch device), and allows for the correct routes to be granularly installed into correct VRFs by the controller. Second, MPLS VPN route transfer may be advantageous over unicast routing between the controller and the network device followed by a VRF-lite route leaking because there may be route overlaps between VRFs. Finally, in this implementation, only a single VPN-IP session (e.g., VPN-IPv4) session is needed between the controller and the network device (as opposed to having separate IPv4 sessions for configuring each VRF).

To achieve the route transfer, the controller generates routes (for export to the network device) such that every route includes: (a) a route target matching a route target of at least one VRF on the network device; (b) a next hop for reaching the device identified by the route target; and (c) a VPN label for the route (e.g., an MPLS label). The next hop may be a next hop of a device (e.g., in the case of a unicast or static connection) or next hop of a VxLAN tunnel (when the VRF includes a VxLAN tunnel definitions). The VPN label may be a bogus MPLS label included simply to satisfy the requirements of Multiprotocol Extensions for BGP (MP-BGP) standard. Such a label may not be used for any practical purpose in this implementation.

In normal operation, the network device cannot import an MPLS route (e.g., a route with an MPLS label) unless the network device includes an MPLS tunnel definition that can be used to resolve the next hop of the received MPLS route. As described above, in this implementation, the network device lacks any MPLS tunnel definitions. Accordingly, normally, such a route would not be installed into any VRF on the network device. Accordingly, a special configuration is needed to enable such MPLS VPN-IPv4 or VPN-IPv6 AFI/SAFI transport to install routes stored by the controller in the correct VRFs of the network device that itself lacks any MPLS tunnel definitions.

To solve this problem, the network device is configured to include a new private next hop configuration knob that modifies the route import behavior of the network device. In particular, when the private next hop configuration is active, all MPLS routes received from the controller are treated as implicitly eligible in the VPN BGP RIB of the network device. For example, the network device will be configured via the private next hop configuration not to attempt to resolve VPN next hop in the default VRF. In some embodiments, the network device will lack any VPN peers, and will thus not export such routes. In some embodiments, the network device may have one or more VPN peers, but even in this scenario the routes may be added to an ineligible list to prevent their export.

Once the routes are received in this manner, the network device will always attempt to install the route into all imported VRFs with a matching route target. During this import into a respective VRF, the network device will attempt to resolve the route in the respective VRF. In particular, the network device is configured to only attempt to resolve the next hop in the unicast RIB of the respective VRF. If the next hop is successfully resolved, the route is imported into the respective VRF and marked eligible. In this way the MPLS VPN-IPv4 or VPN-IPv6 AFI/SAFI transport to install routes into particular VRFs of the network device succeeds even when the network device lacks any MPLS definitions.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which:

FIG. 5 is another flowchart of an illustrative process operation of a packet forwarding device, in accordance with some embodiments of the present disclosure.

DETAILED DESCRIPTION

Figure 1:
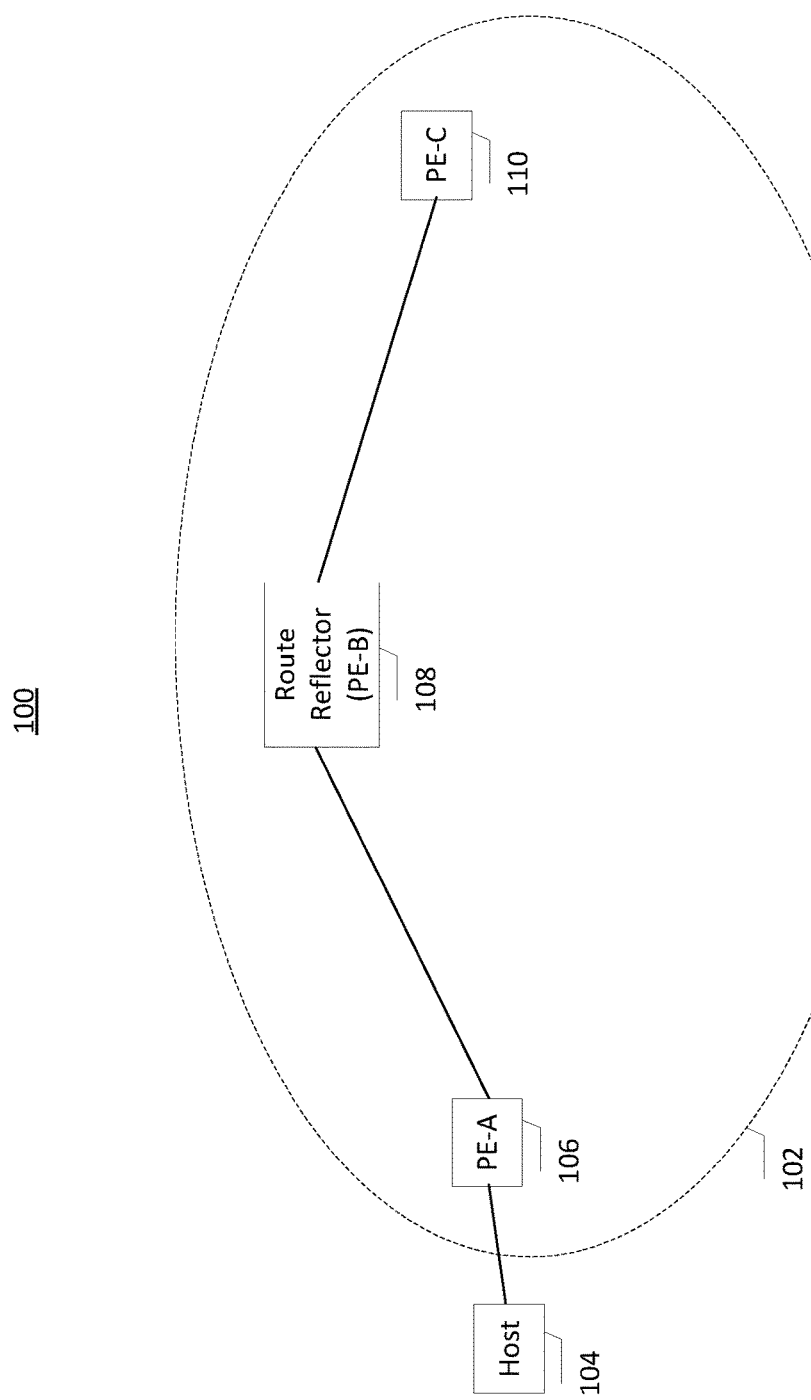
FIG. 1 shows an illustrative network topology of a network utilizing BGP to exchange routing and reachability information with the user of a Route Reflector.

FIG. 1 shows an illustrative diagram of system 100 for operations of network 102 which includes several packet forwarding devices (e.g., PE devices) that are configured to utilize Border Gateway Protocol (BGP) to exchange routing and reachability information between each other. For example, network 102 may be a VPN network, an EVPN network, or an MPLS network. In some embodiments, packet forwarding devices of network 102 may utilize short path (tunnel) labels in addition to or instead of long network addresses to route packets. The labels may identify paths (e.g., virtual paths) between distant nodes (e.g., PEs or hosts) rather than simply list addresses of endpoints. For example, such a tunnel label may be a Multiprotocol Label Switching (MPLS) label or a Virtual Extensible LAN (VxLAN) identifier (VNI).

As shown, network 102 includes provider edge (PE) 106 and PE 110. It should be noted that while only PEs 106 and 110 are shown, network 102 may include any number of PE devices. PE 106 is shown as locally connected to host 104. In some embodiments, host 104 may be a real or a virtual device (e.g., a virtual host controlled by a hypervisor). Host 104 may be connected to PE 106 in any suitable manner (e.g., via a Virtual Ethernet Segment). While PE 106 is shown as connected to a single host, PE 106 may be connected to any number of host devices. PE 110 may also be connected to any number of host devices (not shown). Network 102 may also include Route Reflector (RR) device 108.

In some embodiments, links between hosts, PE devices, and RR devices of network 102 may be an overlay of virtual links configured over an underlay of physical devices. In some embodiments, the underlay may be a mesh of devices. In some embodiments, devices of network 102 may have an Ethernet Virtual Private Network (EVPN) configured for all devices (hosts and provider edges).

In some implementations, network 102 may be an autonomous system in which the PEs 106 and 110 rely on Interior Border Gateway Protocol (IBGP) to propagate known network routes (e.g., routes to hosts or to other PEs). In some implementations (not shown), to avoid problems such as routing loops (e.g., to avoid split horizon rules), the PEs of network 102 may operate as a part of complete IBGP mesh. In such implementations, each PE is able to forward new route information (e.g., information regarding a newly connected host) to all other PEs in the mesh network. For example, all PEs may be IBGP peers. However, as the network grows, establishment and maintenance of a full mesh may be difficult or infeasible because the number of links will grow exponentially with the addition of new PEs.

To overcome the scalability problem, network 102 may utilize Route Reflector (RR) devices such as RR device 108. An RR device 108 may be configured to relay route received route information. For example, RR device 108 may store in its memory an export route target list that identifies devices (e.g., some subset of PEs in network 102) that it will relay newly received route information to. For example, RR device 108 may be configured to relay route information to PE 110 (e.g., due to identification of PE 110 being stored in an export route target community configuration field of RR device 108.)

In some embodiments, RR device 108 may also be a PE device that is configured to route data in addition to propagating route or reachability information. However, as shown in FIG. 1, RR device 108 is a dedicated route reflector device that does not, on its own, route or bridge data packets in network 108, which may be a virtual private network (VPN) or ethernet virtual private network (EVPN)

In some embodiments, network 102 may be configured with MPLS topology. For example, each of PE 106 and 110 may be configured to store in its respective tunnel routing information base (RIB), route definition for each MPLS label. Each MPLS label may identify a virtual link (e.g., a path) between distant nodes rather than simply specifying an endpoint. In addition, each PE 106 and 110 and RR device 108 may have a unicast RIB for storing routes to particular network destinations and metrics (distances) associated with those routes.

In FIG. 1, RR device 108 is not in a traffic forwarding path and thus lacks MPLS tunnel definitions and/or VNI definitions. In one approach, a BGP implementation requires an RR device (e.g., RR device 108) after receiving reachability information (e.g., a route) to check its RIBs to determine if the next hop for the received route is reachable before advertising that route to other network devices (e.g., to devices identified by export route targets).

In the implementation shown in FIG. 1, RR device 108 lacks the MPLS and/or VNI definitions. In one example, PE 106 may transmit reachability information to RR device 108. For example, PE 106 may advertise a route to itself, to host 104 (connected to PE 108) or to another PE in network 102. The reachability information may include an address of a device that is advertised as reachable, a next hop address for routing packets to the device that is advertised as reachable, and a tunnel label associated with the path to the device that is advertised as reachable. For example, reachability information may identify a device with address 1.1.1.1 as reachable with next hop address 5.5.5.5 and tunnel label L1 (e.g., an MPLS label or VNI tag). For example, host 104 may have address 1.1.1.1 and may be advertised as reachable via next hop address 5.5.5.5 (e.g., where 5.5.5.5 is an address of the PE 106) with tunnel label L.

When such reachability information is received by RR device 108, in some implementations, RR device 108 references its tunnel RIB to check if a next hop (e.g., next hop address 5.5.5.5) can be resolved. However, since RR device 108 lacks the MPLS and/or VNI definitions, RR device 108 will be unable to use its tunnel rib to resolve the next hop (associated with label L1) in its tunnel RIB (e.g., the tunnel RIB will lack any forwarding information for next hop address 5.5.5.5 with label L1) and thus an exact match will not be established in the tunnel RIB. In one approach after the failure of the resolution of the next hop, RR device 108 will simply not forward the reachability information to any devices identified by its export route target list.

In one approach, the RR device may be configured to simply skip the next hop resolution step in its tunnel RIB for establishing path eligibility for reachability information with tunnel labels. However, such an approach limits any kind of granularity, and simply allows for RR to propagate all routes, regardless of from where they were received and what they advertise.

In some embodiments, in the approach shown in FIG. 1, RR device 108 may be configured to attempt resolving routes that include a tunnel label (e.g., an MPLS label) using its unicast RIB (e.g., essentially by ignoring the tunnel label in the reachability information). For example, a unicast may be pre-configured on RR device 108 to include expected addresses (e.g., a PE from which routes with a tunnel label may be expected to be received) in combination with an arbitrary next hop (e.g., a bogus next hop). In another example, a prefix of the address of such PE may be included in the unicast RIB of the RR with an appropriate subnet mask. The installation of a bogus next hop IP address in the unicast RIB of RR device 108 is not problematic because in this implementation, RR device 108 will never route actual data packets using the unicast RIB because RR device 108 is not in any data forwarding path of network 102. In some embodiments, the unicast RIB may be contained in a default VRF instance of RR device 108. For example, unicast RIB may have one or more rows as shown below:

TABLE 1

| Address | CIDR Mask | Next hop |
|---------|-----------|----------|
| 5.5.5.5 | /32 | 10.10.10.10 |
| 5.5.5.0 | /24 | 10.10.10.10 |

For example, RR device 108 device may receive reachability information that identifies device with address 1.1.1.1 (e.g., host 104) as reachable via address of PE 106 (e.g., 5.5.5.5) with associated tunnel label L1 (e.g., an MPLS label or VNI tag). In another example, reachability information may include a range of reachable devices (e.g., reachability information may indicate that devices in range 1.1.1.0/24 are reachable, which would provide reachability information for 256 devices). RR device 108 may then reference its unicast RIB (e.g., as shown in Table 1) and determine that next hop address from the reachability information 5.5.5.5 can be resolved (e.g., because unicast RIB lists a next hop for that address or lists a next hop for a prefix matching that address). For example, entry 5.5.5.5/32 may uniquely match the "5.5.5.5," address while entry 5.5.5.0/24 may match all addresses that begin with 5.5.5 and have any eight final bits (in binary notation).

Accordingly, since the unicast RIB of RR device 108 was preconfigured with a next hop (e.g., a bogus next hop) for the address or for the prefix of the address of PE 106 (e.g., as shown in Table 1), RR device 108 may successfully resolve the received reachability information using its unicast RIB. RR device 108 may then proceed to propagate the received reachability information (e.g., an MPLS route or EVPN route) to devices identified in its export route target list. For example, information that address 1.1.1.1 is reachable with next hop 5.5.5.5 and label L1 may be forwarded from RR device 108 to device PE 110. PE 110 may then install the route. Next time, when PE 110 receives a packet destined to address 1.1.1.1., PE 110 may route in accordance with this installed route.

In some embodiments, the unicast RIB of RR device 108 may also include a default drop route (e.g., route for address 0.0.0.0 with a 0.0.0.0 subnet mask). For example, unicast RIB may have one or more rows as shown below:

TABLE 2

| Address | CIDR Mask | Next hop |
| --- | --- | --- |
| 5.5.5.5 | /32 | 10.10.10.10 |
| 5.5.5.0 | /24 | 10.10.10.10 |
| 0.0.0.0 | /0 | 10.10.10.10 |

Row 3 of Table 2, as an entry, in the unicast RIB will guarantee resolvability of any next hop (as it will match any address). In some embodiments, such a default drop route may be used to mimic skipping a next hop resolution step for establishing path eligibility, for example, if granularity is not needed in certain situations.

Figure 2:
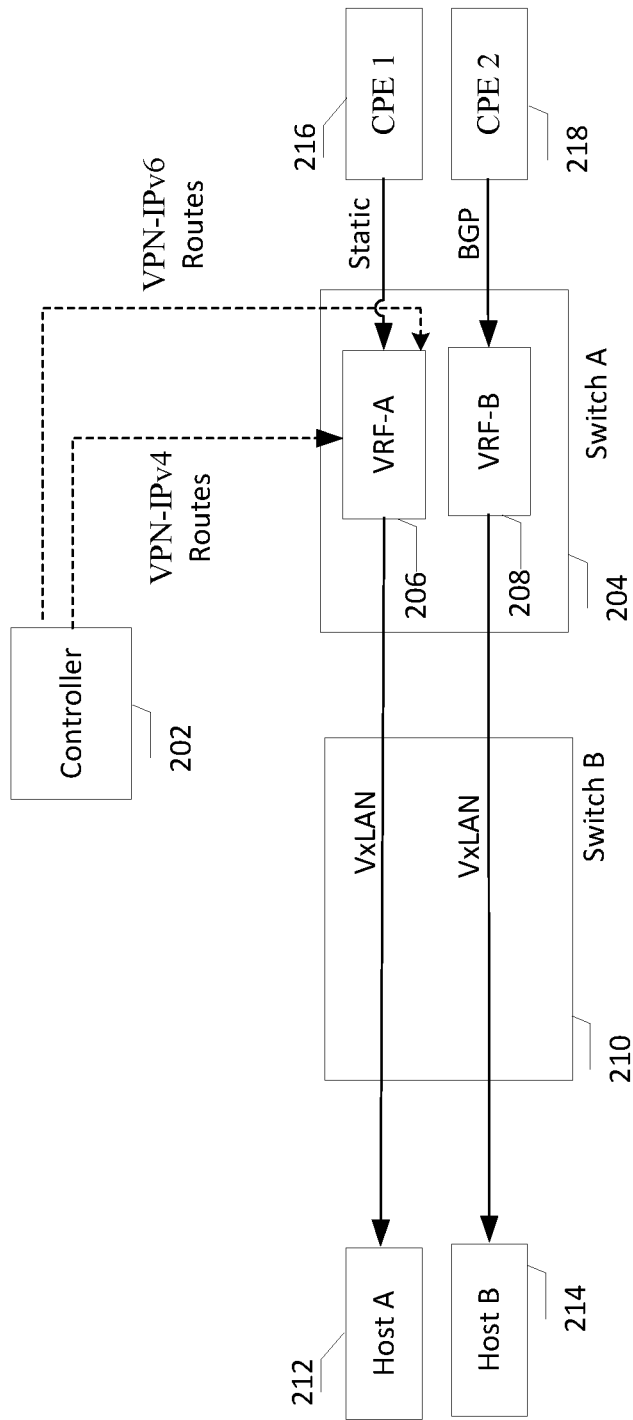
FIG. 2 shows an illustrative network topology for a network that includes a packet forwarding device that may receive route information from a controller device.

FIG. 2 shows an illustrative diagram of system 200, which utilizes a networked controller device 202 to install routes to a network device (e.g., to switch 204). In some embodiments controller 202 may be connected to switch 204 via any kind of suitable network connection (e.g., a connection that supports propagation of VPN-IPv4 routes and VPN-IPv6 routes).

FIG. 2. shows switch 204 as being connected to customer premise equipment (CPE) 216 and 218 as well as to another switch 210 which ultimately connects to hosts 212 and 214. In some embodiments, Customer Premise Equipment (CPE) 216 may be connected to switch 204 via static network connection. In some embodiments, CPE 218 may be connected to switch 204 via a network connection governed by BGP protocol. In some embodiments, switch 204 may be a part of same virtual network (e.g., VxLAN-enabled EVPN network) as switch 210. In this embodiment, hosts 212 and 214 may be reachable by switch 204 via VxLAN tunnels (e.g., tunnels that include switch 210 as a next hop). It should be noted that while switch 204 is shown in FIG. 1 to be connected to devices 210, 212, 214, 216, and 218, switch 204 may be connected to any number of devices or virtual devices using any number of suitable network links.

In some embodiments, links between devices 202, 204, 210, 212, 214, 216, and 218 may be an overlay of virtual links configured over an underlay of physical devices. In some embodiments, the underlay may be a mesh of devices.

In some embodiments, switch 204 may be configured to forward packets to devices 216, 218, 212, 214 and 210 according to a RIB or RIBs stored by switch 204. As shown, switch 204 may include two VRFs 206 and 208, which may each include respective RIBs. In some embodiments, switch 204 may include any number of VRFs. Each VRF instance may be a separate instance that includes its own RIB or RIBs for defining multiple paths (e.g., BGP-selected unicast paths, static paths, VxLAN tunnels, etc.) to a list of devices. The network device may have separate VRF instances 206 and 208 to segment network paths without requiring multiple routers. For example, each VRF instance 206 and 208 may represent a virtual private network (e.g., of a cloud customer).

In some embodiments, some or all routes on VRFs 206 and 208 (both tunnel routes and IP unicast routes) of switch 204 may be configured via routes received from controller 202. For example, controller 202 may provide desired routes to various network devices that the controller is not directly connected to (e.g., devices 212, 214, 210, 216, and 218). In some embodiments, such routes may be imported from a BGP VPN address family identifier/sub-address family identifier AFI/SAFI table stored by controller 202. As shown in FIG. 2, a transfer of routes from the BGP VPN AFI/SAFI table stored by controller 202 to switch 204 may be performed via MPLS VPN-IPv4 or VPN-IPv6 AFI/SAFI transport.

However, in some embodiments, switch 204 may have no local MPLS tunnel definitions. In some implementations, switch 204 may be a part of a data path that does not take any MPLS tunnel as egress. That is, packets forwarded by switch 204 may instead be routed by a forwarding decision based on how the BGP path next-hop resolves using a routing table local to one of the VRFs 206 or 208 (e.g., the egress for packets may be local to one of the VRFs 206, 208 in which the forwarding lookup is being done). For example, next-hops of switch 204 may be resolved using routing tables local VRFs 206 or 208 using BGP algorithms.

In a conventional MPLS VPN AFI/SAFI setup, for a route to be eligible for import into any one of VRFs 206 and 208, that route needs to be deemed resolvable by switch 204. In particular, switch 204 would, conventionally, attempt resolving the next hop address of the route using its tunnel RIB. If this fails, the route will typically not be imported into one or more of VRFs 206 and 208. Accordingly, an improved configuration is provided by system 200 to enable such MPLS VPN-IPv4 or VPN-IPv6 AFI/SAFI transport to install routes stored by the controller 202 in VRFs 206, 208 of the switch 204 that lacks any MPLS tunnel definitions in its tunnel RIB.

Switch 204 may be configured (e.g., via command line interface) to include a private next hop configuration knob which modifies the route import behavior of switch 204. In particular, when the private next hop configuration is active, all MPLS routes received from controller 202 are treated as implicitly eligible in a tunnel rib (e.g., in VPN BGP RIB) of switch 204. For example, switch 204 may be configured via the private next hop configuration to attempt resolving the VPN next hop in the default VRF (e.g., its tunnel VRF).

Once a route with an MPLS label is received when private next hop configuration knob is active on switch 204, switch 204 will always attempt to install the received route into one or more of VRFs 206 and 208. In some embodiments, controller 202 generates routes (e.g., based on a local BGP VPN AFI/SAFI table) such that every route includes: (a) a route target matching an import route target of at least one VRF on the network device; (b) a next hop for reaching a device identified by that route target; and (c) a VPN label for the route (e.g., an MPLS label). The next hop may be a next hop for reaching a statically connected device (e.g., device 216) or next hop for BGP connected device (e.g., device 218) or next hop of a VxLAN tunnel for reaching one of hosts 212 or 214 (e.g., when the VRF includes VxLAN tunnel definitions). The VPN label may be a bogus MPLS label included to satisfy the requirements of Multiprotocol Extensions for BGP (MP-BGP) standard. Such a label may not be used by switch 204.

For example, a route generated by controller 202 may include (a) a route target identifying CPE 216 or 218, (b) next hop for reaching a CPE (e.g., device 216 or 218), and (c) a bogus MPLS label L2 (e.g., a label not associated with any real path). In another example, a route generated by controller 202 may include (a) a route target for host 212, (b) a next hop of a VxLAN tunnel for reaching host 212 (e.g., a VxLAN tunnel that includes switch 210), and (c) a bogus MPLS label L2 (e.g., a label not associated with any real path).

When switch 204 receives such a route (e.g., a VPN route) and when private next hop configuration knob is active, switch 204 will treat that route as implicitly eligible in its tunnel RIB (e.g., in VPN address-family BGP RIB). Switch 204 may then identify which of VRFs 206 and 208 includes an import route target that matches a route target from the received route. For example, if the route target from the received route identifies host 212, switch 204 may identify VRF 206 because it includes an import route target that identifies host 212. In another example, if the route target from the received route identifies host 214, switch 204 may identify VRF 208 because it includes an import route target that identifies host 212. In some embodiments both VRFs may be identified (e.g., if both VRFs 206 and 208 include an import route target matching the route target from the received route).

During the import into the identified VRF (e.g., into one of VRFs 206 and 208), switch 204 device will attempt to resolve the next hop identified by the received route in the identified VRF. In some embodiments, switch 204 may be configured to attempt resolving the next hop only in the unicast RIB of the respective VRF. If the next hop is successfully resolved, the route is imported into the identified VRF and marked eligible. In this way the MPLS VPN-IPv4 or VPN-IPv6 AFI/SAFI transport from controller 202 to install routes into particular VRFs of switch 204 succeeds even when switch 204 lacks any MPLS definitions (e.g., in the default tunnel RIB).

Figure 3:
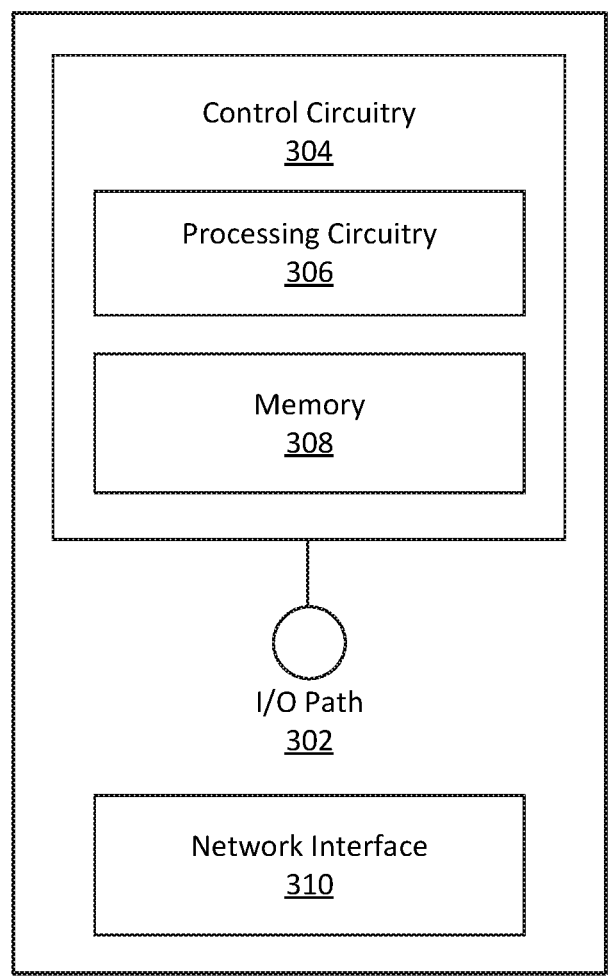
FIG. 3 shows a diagram of an illustrative network device, in accordance with some embodiments of the disclosure.

FIG. 3 shows a generalized embodiment of a network device usable in a system 100 or system 200, in accordance with some embodiments of the disclosure. In particular, device 300 of FIG. 3 may be any of the devices depicted in FIGS. 1 and 2 (e.g., devices 104, 106, 108, 110, 202, 204, 210, 212, 214, 216 and 218) or may a physical or virtual device hosting any of physical or virtual devices 104, 106, 108, 110, 202, 204, 210, 212, 214, 216 and 218. Device 300 may be a router, an L3 switch, an L2 router, a route reflector, or a host, and/or any other computing device that may be configured to participate in a network data path or route propagation path. Device 300 may receive data at network interfaces 310 and provide the received data to control circuitry 304 via an input/output (I/O) path 302. Control circuitry 304 includes processing circuitry 306 and storage 308. Storage 308 may include volatile memory (such as random-access memory (RAM), for example, static RAM and/or dynamic RAM), which does not retain its contents when power is turned off, and non-volatile memory (such as, for example, a solid state drive (SSD), a hard disk drive (HDD), electrically erasable programmable read-only memory (EEPROM), etc.), which does retain its contents when power is turned off. Control circuitry 304 may send and receive commands, requests, and other suitable data using I/O path 302. As noted above, I/O path 302 connects control circuitry 304 (and specifically processing circuitry 306) to network interface 310, which in turn connects device 300 to one or more other devices. For example, I/O path 302 may propagate packets or reachability information.

Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 304 executes instructions suitable to implement any of the techniques described above or below.

Storage 308 may be an electronic storage device that is part of control circuitry 304. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, storage 308 may include unicast RIBs and/or tunnel RIBs as discussed above and below.

Figure 4:
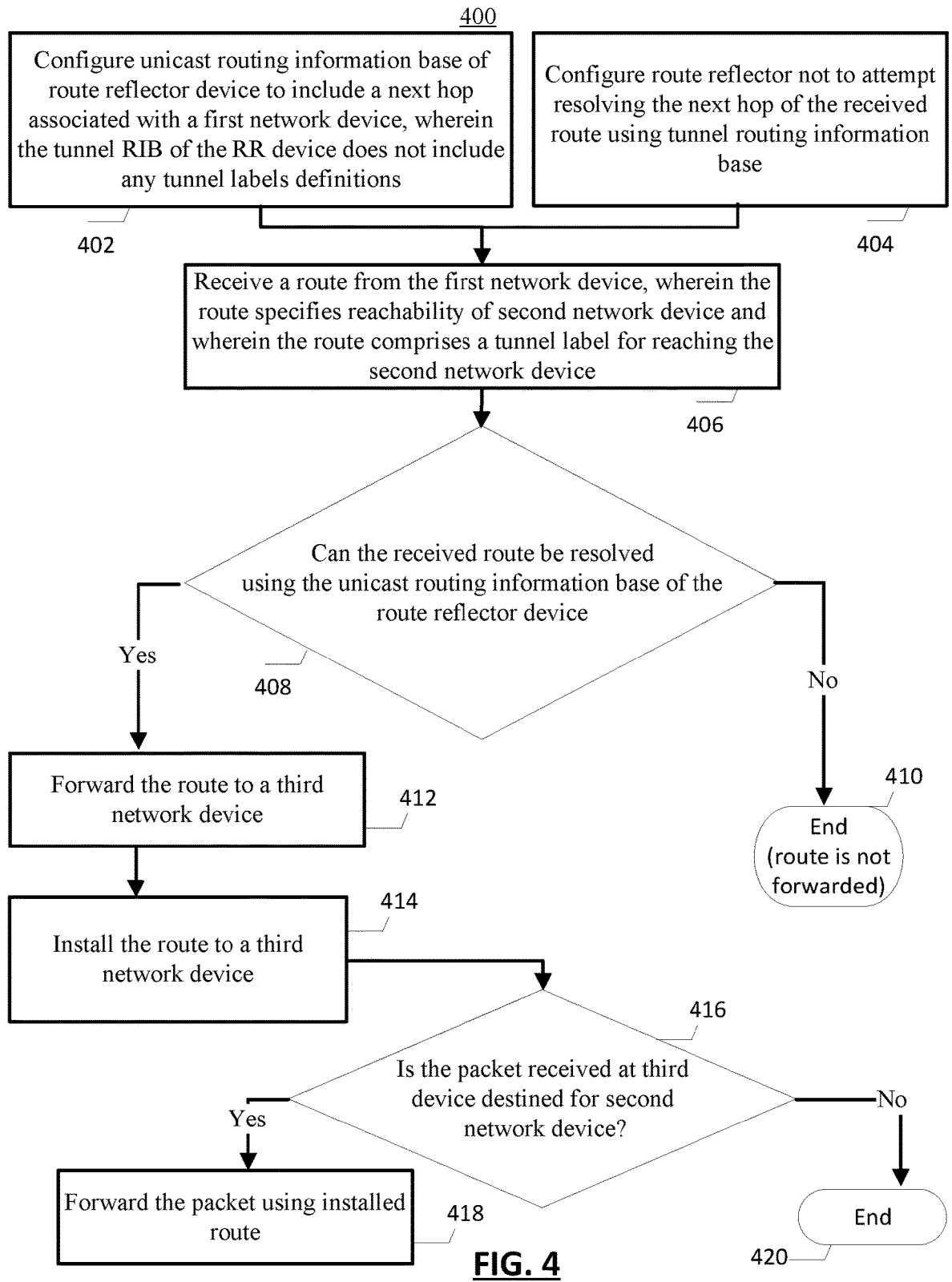
FIG. 4 is a flowchart of an illustrative process operation of a route reflector device, in accordance with some embodiments of the present disclosure.

FIG. 4 is a flowchart 400 of an illustrative process for propagating reachability information in a network, e.g., in routing architecture 100 (e.g., as illustrated by system 100 of FIG. 1). Process 400 may be performed by physical or virtual control circuitry, such as control circuitry 304 of device 300 (FIG. 3). For example, process 400 may be performed by control circuitry of route reflector 108.

At 402, the control circuitry (e.g., control circuitry of the route reflector) may configure a unicast routing information base of a route reflector device (e.g., RR device 108) to include a next hop associated with a first network device (e.g., PE 106). In some embodiments this step is performed when the desired behavior of the RR device is to propagate routes received from the first network device. In particular, this step may be needed when the tunnel RIB of the RR device does not include any tunnel labels definitions (e.g., when the RR device is not in the data path of a network).

At 404, the control circuitry may configure the RR device not to attempt resolving next hop of received routes using the tunnel routing information base (e.g., tunnel RIB in the default VRF of the RR device). This step may be needed to avoid failure in route propagation when the RR device does not include any tunnel labels definitions.

At 406, the control circuitry may receive a route from the first network device (e.g. via network interface 310), wherein the route specifies the reachability of a second network device (e.g., a host connected to the first network device) and wherein the route comprises a tunnel label for reaching the second network device (e.g., an MPLS label).

At 408, the control circuitry may check whether the received route can be resolved using the unicast routing information base of the route reflector device. For this example, this may be possible when the address of the first network device was included into a unicast RIB at step 402 (e.g., with a bogus associated next hop). Some exemplary RIBs are shown in Tables 1 and 2 above. If this check fails, process 400 ends at 410, with route information not being propagated by the RR device. If this check succeeds, process 400 proceeds to step 412.

At 412, the control circuitry device forwards the received route (e.g., the route from the first network device) to a third network device (e.g., a device identified in a route target list of the RR device). Notably, this forwarding may forward a route with an MPLS label even when the RR device lacks any MPLS definitions.

At 414, control circuitry of the third network device installs the route (e.g., into its tunnel RIB). At 416, control circuitry of the third network device may check if it needs to route a packet to an address of the second network device. If not, process 400 ends at step 420. If such a packet is received and need to be forwarded, control circuitry of the third network device, at step 418, routes the packet using the received route information (e.g., that includes address of the first network device as the next hop and the MPLS label of the route initially sent by the first network device).

FIG. 5 is a flowchart 500 of an illustrative process for propagating reachability information in a network, e.g., in routing architecture 200 (e.g., as illustrated by system 200 of FIG. 2). Process 500 may be performed by physical or virtual control circuitry, such as control circuitry 304 of device 300 (FIG. 3). For example, process 500 may be performed by control circuitry of a network device (e.g., switch 204).

At 502, the control circuitry of a network device (e.g., control circuitry of switch 204) may configure the network device to operate without local MPLS tunnel definitions. For example, the network device may be configured to make BGP egress decisions for routed packets using RIBs contained in VRFs of the network device. At 504, the control circuitry may further configure the network device to skip the tunnel (e.g., VPN) next hop verification in the default VRF instance of the network device. For example, this may be performed by activating a private next hop configuration knob.

At 506, control circuitry of a controller (e.g., controller 202) may configure the controller to provide VPN routes to a network device via MPLS VPN-IPv4 or VPN-IPv6 AFI/SAFI transport.

At 508, the control circuitry of a network device (e.g., control circuitry of switch 204) may receive a virtual network route from the controller (e.g., via network interface 310). The network route may include the following elements: (a) a route target; (b) a next hop for the route; and (c) a tunnel label (e.g., an MPLS label).

At 510, the control circuitry of a network device may check if a private next hop configuration knob is enabled that causes the network device to skip the tunnel (e.g., VPN) next hop verification in the default VRF instance of the network device (such a check is conventionally required). If the private next hop configuration knob is not enabled, process 500 ends at step 516 with route installation failing (because the MPLS label from the received route will not match any MPLS tunnel definitions in the default VRF), and the route will not be installed in any VRF instance on the network device. If the private next hop configuration knob is enabled, process 500 proceeds to step 512.

At 512, the control circuitry of a network device may identify at least one local VRF instance that includes an import route target that matches the route target of the received route. At 514, the control circuitry of a network device may check if the next hop of the route (received in step 508) can be resolved using a unicast routing information base (RIB) of the identified VRF instance (identified in step 512). If the next hop cannot be resolved, process 500 ends at step 516. If the next hop is resolved, process 500 continues at 518.

At 518, the control circuitry of a network device may install the route (received in step 508) in the identified VRF instance (identified in step 512). In the future, if the network device may route packets based on the installed route.

While the processes 400 and 500 described above illustrate a single iteration of route propagation, those skilled in the art will appreciate that these processes may be iteratively repeated for multiple routes propagation steps. The processes 400 and 500 described above are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other suitable embodiment herein, and flowcharts or examples relating to one embodiment may be combined with any other suitable embodiment in a suitable manner, done in different orders, or done in parallel. In addition, the systems and methods described herein may be performed in real time. It should also be noted that the systems and/or methods described above may be applied to, or used in accordance with, other suitable systems and/or methods.

It will be apparent to those of ordinary skill in the art that methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method for installing routes, the method comprising:
receiving, by a first network device, a virtual private network (VPN) route from a controller, wherein the route specifies: (1) a route target, (2) a next hop for the route, and (3) a Multiprotocol Label Switching (MPLS) label, wherein the first network device does not comprise any MPLS tunnel definitions in a default virtual routing and forwarding (VRF) instance;
determining that the first network device is configured to skip the VPN next hop verification in the default VRF instance; and in response to the determining that the first network device is configured to skip a VPN next hop verification in the default VRF:
identifying a VRF instance that comprises an import route target that matches the route target of the received VPN route;
resolving the next hop of the route using a unicast routing information base (RIB) of the identified VRF instance; and
in response to the resolving, installing the route in the identified VRF instance.

2. The method of claim 1, wherein the identified VRF instance is configured to import routes with the route target of the received VPN route.

3. The method of claim 1, wherein the receiving, by the first network device, the virtual private network (VPN) route from the controller comprises receiving the VPN route using one of VPN-IPv4 transfer or VPN-IPv6 transfer.

4. The method of claim 1, wherein the next hop for the VPN route is a next hop of a VxLAN tunnel.

5. The method of claim 1, wherein the MPLS label of the VPN route is a bogus label.

6. The method of claim 1, wherein a transfer of routes from a BGP VPN AFI/SAFI table stored in connection with the first network device may be performed via MPLS VPN-IPv4 transport to install routes in corresponding VRFs of the first network device based on matching route targets configured for each VRF.

7. The method of claim 1 wherein a transfer of routes from a BGP VPN AFI/SAFI table stored in connection with the first network device may be performed via VPN-IPv6 AFI/SAFI transport to install routes in corresponding VRFs of the first network device based on matching route targets configured for each VRF.

8. A system for installing routes, the system comprising:
network circuitry of a first network device configured to:
receive a virtual private network (VPN) route from a controller, wherein the route specifies: (1) a route target, (2) a next hop for the route, and (3) a Multiprotocol Label Switching (MPLS) label, wherein the first network device does not comprise any MPLS tunnel definitions in a default virtual routing and forwarding (VRF) instance; and
control circuitry of the first network device is configured to:
determine that the first network device is configured to skip a VPN next hop verification in the default VRF instance; and
in response to the determining that the first network device is configured to skip the VPN next hop verification in the default VRF:
identify a VRF instance that comprises an import route target that matches the route target of the received VPN route;
resolve the next hop of the route using a unicast routing information base (RIB) of the identified VRF instance; and
in response to the resolving, install the route in the identified VRF instance.

9. The system of claim 8, wherein the identified VRF instance is configured to import routes with the route target of the received VPN route.

10. The system of claim 8, wherein the network circuitry of the first network device is configured to receive the virtual private network (VPN) route from the controller by receiving the VPN route using one of VPN-IPv4 transfer or VPN-IPv6 transfer.

11. The system of claim 8, wherein the next hop for the VPN route is a next hop of VxLAN tunnel.

12. The system of claim 8, wherein the MPLS label of the VPN route is a bogus label.

13. The system of claim 8, wherein a transfer of routes from a BGP VPN AFI/SAFI table stored in connection with the first network device may be performed via MPLS VPN-IPv4 transport to install routes in corresponding VRFs of the first network device based on matching route targets configured for each VRF.

14. The system of claim 8, wherein a transfer of routes from a BGP VPN AFI/SAFI table stored in connection with the first network device may be performed via VPN-IPv6 AFI/SAFI transport to install routes in corresponding VRFs of the first network device based on matching route targets configured for each VRF.

15. One or more non-transitory computer-readable media storing computer-executable instructions that, when executed by a processor, perform a method of installing routes, the method comprising:
receiving, by a first network device, a virtual private network (VPN) route from a controller, wherein the route specifies: (1) a route target, (2) a next hop for the route, and (3) a Multiprotocol Label Switching (MPLS) label, wherein the first network device does not comprise any MPLS tunnel definitions in a default virtual routing and forwarding (VRF) instance;
determining that the first network device is configured to skip a VPN next hop verification in the default VRF instance; and
in response to the determining that the first network device is configured to skip the VPN next hop verification in the default VRF:
identifying a VRF instance that comprises an import route target that matches the route target of the received VPN route;
resolving the next hop of the route using a unicast routing information base (RIB) of the identified VRF instance; and
in response to the resolving, installing the route in the identified VRF instance.

16. The one or more non-transitory computer-readable media of claim 15, wherein the identified VRF instance is configured to import routes with the route target of the received VPN route.

17. The one or more non-transitory computer-readable media of claim 15, wherein a network circuitry of the first network device is configured to receive the virtual private network (VPN) route from the controller by receiving the VPN route using one of VPN-IPv4 transfer or VPN-IPv6 transfer.

18. The one or more non-transitory computer-readable media of claim 15, wherein the next hop for the VPN route is a next hop of VxLAN tunnel.

19. The one or more non-transitory computer-readable media of claim 15, wherein the MPLS label of the VPN route is a bogus label.

20. The one or more non-transitory computer-readable media of claim 15, wherein a transfer of routes from a BGP VPN AFI/SAFI table stored in connection with the first network device may be performed via MPLS VPN-IPv4 transport to install routes in corresponding VRFs of the first network device based on matching route targets configured for each VRF.

* * * * *